(12) United States Patent
Chikuba et al.

(10) Patent No.: US 7,040,969 B1
(45) Date of Patent: May 9, 2006

(54) METHOD AND APPARATUS FOR GRINDING MAGNETIC MEMBER AND METHOD AND APPARATUS FOR TREATING WASTE FLUID

(75) Inventors: Masanori Chikuba, Saga (JP); Sadahiko Kondo, Takarazuka (JP)

(73) Assignee: Neomax Co., Ltd., Osaka (JP)

( * ) Notice: Subject to any disclaimer, the term of this patent is extended or adjusted under 35 U.S.C. 154(b) by 501 days.

(21) Appl. No.: 09/591,508

(22) Filed: Jun. 12, 2000

(30) Foreign Application Priority Data

Sep. 16, 1999 (JP) ................... 11-261805

(51) Int. Cl.
B24B 55/12 (2006.01)

(52) U.S. Cl. ......................................... 451/57; 451/450

(58) Field of Classification Search ................. 451/57, 451/453, 87, 88, 450
See application file for complete search history.

(56) References Cited

U.S. PATENT DOCUMENTS

| 5,071,541 | A | * | 12/1991 | Thompson |
|---|---|---|---|---|
| 5,938,935 | A | | 8/1999 | Schimion .................... 210/695 |
| 6,093,318 | A | * | 7/2000 | Saho et al. |
| 6,267,647 | B1 | * | 7/2001 | Stocker et al. |

FOREIGN PATENT DOCUMENTS

| DE | 692 11 276 T2 | 12/1996 |
|---|---|---|
| JP | 5-92420 | 4/1993 |
| JP | 5-253822 | 10/1993 |
| JP | 06-71195 | 3/1994 |
| JP | 7-60155 | 3/1995 |
| JP | 8-299717 | 11/1996 |
| JP | 10-34011 | 2/1998 |
| JP | 10-175172 | 6/1998 |
| JP | 10-217119 | 8/1998 |
| JP | 10-324887 | 8/1998 |
| JP | 10-277874 | 10/1998 |
| JP | 10-296018 | 11/1998 |
| JP | 10-309647 | 11/1998 |
| JP | 11-276818 | 10/1999 |
| JP | 11-276926 | 10/1999 |
| TW | 363711 | 5/1984 |
| TW | 333472 | 6/1998 |

OTHER PUBLICATIONS

Notice of Rejection to the corresponding Taiwanese Patent Application No. 89111394 (and translation thereof).
*Note: U.S. Patent No. 5,938,935 corresponds to Taiwanese Patent No. 333472)*.

(Continued)

*Primary Examiner*—Robert A. Rose
(74) *Attorney, Agent, or Firm*—Armstrong, Kratz, Quintos, Hanson & Brooks, LLP (57) ABSTRACT

An apparatus for grinding a magnetic member comprises a cutting blade having a cutting edge including heat resistant resin and abrasive grain. A magnetic member including a rare-earth alloy is ground by the cutting blade while grinding fluid primarily made of water is supplied to a grinding region. A magnet separator having a surface magnetic flux density not smaller than 0.25 T magnetically separates sludge from used grinding fluid. Further, the grinding fluid is introduced into a tank, where the sludge contained in the grinding fluid is allowed to coagulate and sediment. The grinding fluid separated from the sludge is used in circulation. The same separation process can be used for separation of sludge containing a rare-earth alloy from waste fluid.

12 Claims, 8 Drawing Sheets

OTHER PUBLICATIONS

Notification of Reason(s) for Refusal to the corresponding Japanese Patent Application No. 2000-181988 (and translation thereof (2 pages)) dated Aug. 20, 2002.
Decision of Refusal to corresponding Japanese Patent Application No. 2000-181988 (and translation thereof (2 pages)).
Publication for the corresponding Philippine Patent Application No. 1-2000-01515; IPO Gazette vol. V No. 9 released on Dec. 10, 2002.
Decision of Refusal to corresponding Japanese Patent Application No. 2000-181988 (and translation thereof (2 pages)).
Publication for the corresponding Philippine Patent Application No. 1-2000-01515; IPO Gazette vol. V No. 9 released on Dec. 10, 2002.
Decision of Refusal to corresponding Japanese Patent Application No. 2000-181988 (and translation thereof (2 pages)).
Publication for the corresponding Philippine Patent Application No. 1-2000-01515; IPO Gazette vol. V No. 9 released on Dec. 10, 2002.
Notification of Reason(s) for Refusal to the corresponding Japanese Patent Application No. 2000-181988 (and translation thereof (2 pages)) dated Aug. 20, 2002.

* cited by examiner

Cutting Blade Wear

| | Removal by Machining ($\times 10^4 mm^3$) | 9 | 18 | 27 |
|---|---|---|---|---|
| ① | Magnet separator : 0.3 T   Cutting Blade Wear ($mm^3$) | 56 | 115 | 160 |
| ② | Magnet separator : 0.25 T  Cutting Blade Wear ($mm^3$) | 55 | 125 | 185 |
| ③ | Magnet separator : 0.2 T   Cutting Blade Wear ($mm^3$) | 70 | 165 | 235 |
| ④ | No magnet separator        Cutting Blade Wear ($mm^3$) | 90 | 183 | 265 |

FIG. 6B

Relationships between Removal by Machining and Cutting Blade Wear

FIG. 7A

Magnet Separator Sludge Removing Ability (per 500 cc of Grinding fluid)   ⑤   ⑥

|  | Before treatment | One pass through magnet separator | Two passes through magnet separator |
|---|---|---|---|
| Volume of sediment (cc) | 40 | 4 | 1 |
| Sludge containing rate (%) | 8.0 | 0.8 | 0.2 |

FIG. 7B

Magnet Separator Sludge Removing Ability

FIG. 8A

Sludge removal rate

| Surface magnetic flux density (T) | 0 | 0.1 | 0.2 | 0.25 | 0.3 | 0.35 |
|---|---|---|---|---|---|---|
| ⑦ Magnet separator (without tank) sludge removal rate (%) | 0 | 20 | 40 | 80 | 90 | 92 |
| ⑧ Magnet separator (with tank) sludge removal rate (%) | 40 | 50 | 60 | 85 | 93 | 94 |

FIG. 8B

Relationships between Magnet Roller Surface Magnetic Flux Density and Sludge Removal

METHOD AND APPARATUS FOR GRINDING MAGNETIC MEMBER AND METHOD AND APPARATUS FOR TREATING WASTE FLUID

BACKGROUND OF THE INVENTION

1. Field of the Invention

The present invention relates to a method and an apparatus for grinding a magnetic member, and a method and an apparatus for treating waste fluid. More specifically, the present invention relates to a method and an apparatus for grinding a magnetic member and a method and an apparatus for treating waste fluid in which waste grinding fluid containing sludge as waste of grinding is purified and reused.

2. Description of the Related Art

A related art for purifying the grinding fluid is disclosed in the Japanese Patent Laid-Open No. 10-309647. According to this related art, the grinding fluid containing impurities is stored in a tank, agitated by a nozzle for separation of sludge and abrasive grain from the grinding fluid. Then, the sludge is picked out of the tank by a magnet separator.

Another related art is disclosed in the Japanese Patent Laid-Open No. 8-299717. According to this related art, a filter is used for purification of the grinding fluid.

However, according to the former related art, small particles in the sludge cannot be removed sufficiently. If the small particles in the sludge are to be removed sufficiently, a large-capacity tank of about 3000 liters is required per apparatus, leading to a problem that the apparatus has to be large.

The sludge produced by grinding the magnetic member, particularly by grinding a rare-earth alloy, contains fine particles having a diameter of approximately 2 μm to 3 μm. According to the latter related art, the filter is often clogged by these particles, making difficult to efficiently remove the sludge containing these fine particles.

Further, if the grinding fluid is reused without sufficient removal of the sludge, when cutting the magnetic member by a grinding blade including heat resistant resin and super hard abrasive grain, a grinding edge wears prematurely.

SUMMARY OF THE INVENTION

It is therefore a primary object of the present invention to provide a method and an apparatus for grinding the magnetic member and a method and an apparatus for treating the waste fluid which can be more compact and effective in the separation of the fine-particle sludge.

According to an aspect of the present invention, there is provided a method for grinding a magnetic member, comprising: a first step of grinding a magnetic member by grinding means having an edge including heat resistant resin and super hard abrasive grain while supplying grinding fluid to a grinding region; and a second step of magnetically separating sludge from the grinding fluid drained from the grinding region.

According to another aspect of the present invention, there is provided an apparatus for grinding a magnetic member. The apparatus comprises: grinding operation means for grinding a magnetic member by using grinding means having an edge including heat resistant resin and super hard abrasive grain while supplying grinding fluid to a grinding region; and magnetic separation means for separating sludge from the grinding fluid drained from the grinding region.

According to still another aspect of the present invention, there is provided a rare-earth magnet obtained by using the above method.

According to the present invention, the sludge can be magnetically separated from the used grinding fluid by the magnetic separation means such as a magnet separator. Therefore, differing from the related art, there is no need use a large tank, and the apparatus can be compact. If the grinding means has an edge including heat resistant resin and super hard abrasive grain, and if the grinding fluid contains fine-particle sludge, the edge is prematurely worn. The present invention is especially effective in such a case as above, because the fine-particle sludge can be separated according to the present invention, making possible to reduce the problem. Further, the present invention is effective when obtaining a rare-earth magnet.

Preferably, the sludge is further separated from the grinding fluid by allowing the sludge to sediment, for example by introducing the grinding fluid in a tank disposed on a downstream side of the magnetic separation means. When the magnetic separation treatment is performed to the grinding fluid, the sludge which is not removed from the grinding fluid is also magnetized. Therefore, by introducing the grinding fluid into the tank for example, the magnetized sludge in the grinding fluid can be allowed to coagulate and sediment quickly in the tank. In this process, even if the sludge contains fine particles which does not sediment easily, the sludge is sedimented by the coagulation, and can be separated quickly from the grinding fluid. Therefore, there is no need to use the large tank.

Preferably, if the magnetic member includes a rare-earth alloy, the magnetic separation means has a surface magnetic flux density not smaller than 0.25 T. The rare-earth alloy is easily oxidized, and it is presumed that the oxidization proceeds even more easily in the sludge, increasing an amount of non-magnetic particles, thus making the sludge less sensitive to magnetic force. Thus, the sludge containing the rare-earth alloy is difficult to draw magnetically. However, by using the magnetic separation means having the surface magnetic flux density not smaller than 0.25 T, it becomes possible to increase ability to separate the sludge, and thereby reduce wear in the grinding means.

Further, preferably, the grinding fluid is primarily made of water. If the primary ingredient of the grinding fluid is water, it becomes possible to draw the sludge at a lower magnetic flux density since water has a smaller resistance than oil.

Preferably, the grinding fluid after the separation of the sludge is supplied to the grinding region for use in circulation. In this case the grinding fluid can be used efficiently.

According to still another aspect of the present invention, there is provided a method for treating waste fluid, comprising a step of separating sludge containing a rare-earth alloy from waste fluid by using magnetic separation means having a surface magnetic flux density not smaller than 0.25 T.

According to still another aspect of the present invention, there is provided an apparatus for treating waste fluid, comprising magnetic separation means having a surface magnetic flux density not smaller than 0.25 T for separating sludge containing a rare-earth alloy from waste fluid.

According to the present invention, by using the magnetic separation means having the surface magnetic flux density not smaller than 0.25 T, the sludge containing the rare-earth alloy which is difficult to draw can be separated from the waste fluid more easily.

Preferably, the sludge is further separated from the waste fluid by allowing the sludge to sediment, for example by introducing the waste fluid in a tank disposed on a downstream side of the magnetic separation means. When the magnetic separation treatment is performed to the waste fluid, the sludge which has not been drawn to the magnetic separation means is also magnetized. Therefore, by introducing the waste fluid after magnetic separation into the tank for example, the magnetized sludge in the waste fluid can be allowed to coagulate and sediment quickly in the tank. In this process, even if the sludge contains fine particles which do not sediment easily, the sludge is sedimented by the coagulation, and can be separated quickly from the waste fluid. Therefore, there is no need to use the large tank.

The above objects, other objects, characteristics, aspects and advantages of the present invention will become clearer from the following description of embodiments to be presented with reference to the accompanying drawings.

DETAILED DESCRIPTION OF THE PREFERRED EMBODIMENTS

Hereinafter, an embodiment of the present invention will be described with reference to the attached drawings.

Figure 1:
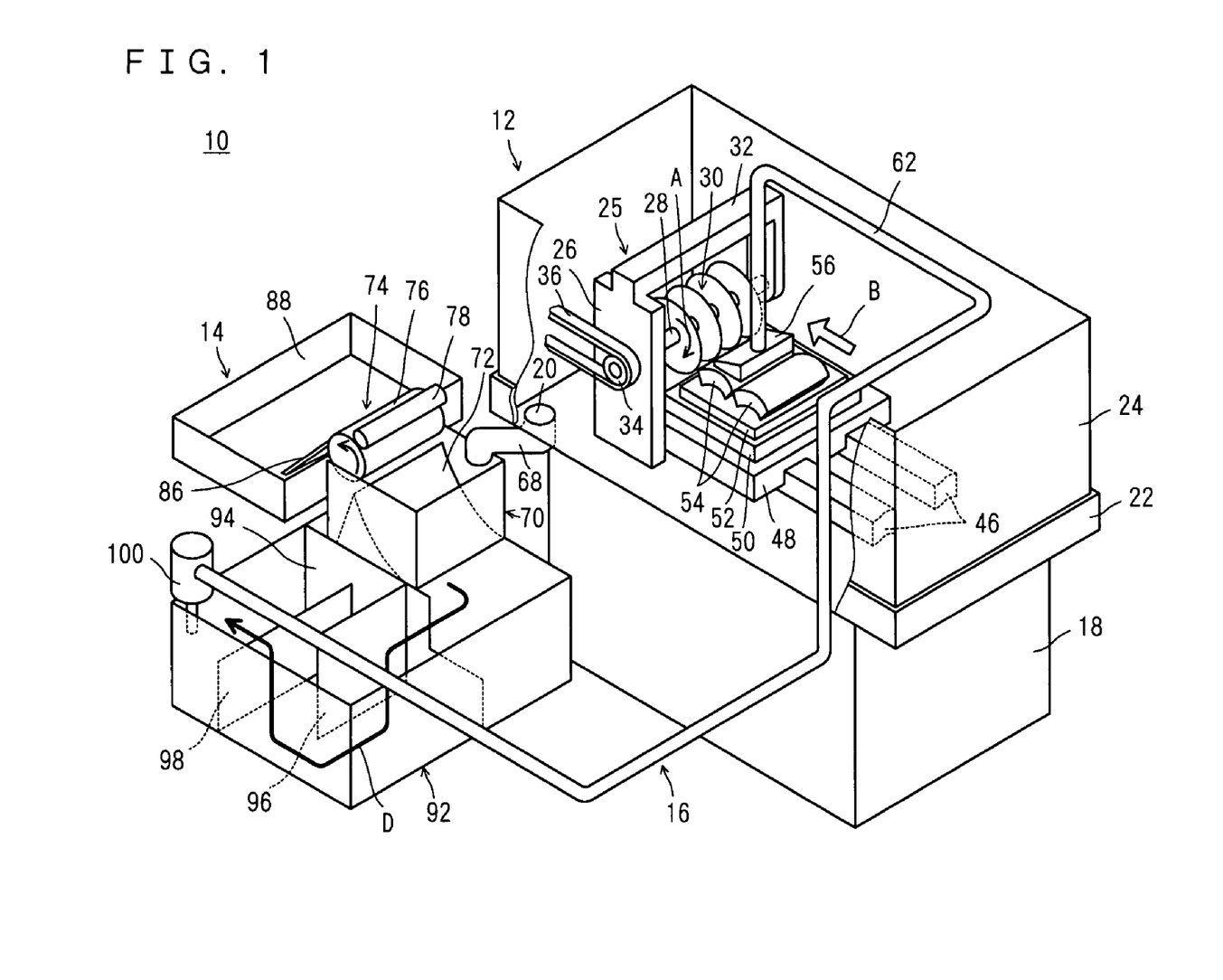
FIG. 1 is a perspective view showing an embodiment of the present invention.

Referring to FIG. 1, an apparatus 10 for grinding a magnetic member, as an embodiment of the present invention, comprises a grinding operation portion 12 for grinding a magnetic member 54 (to be described later), a purifying portion 14 for purifying a grinding fluid 58 by separating sludge 90 (also to be described later) from the grinding fluid 58 used in the grinding operation portion 12, and a circulating portion 16 for re-supplying the purified grinding fluid 58 to the grinding operation portion 12.

The grinding operation portion 12 includes a base 18. The base 18 has an upper surface disposed with an upwardly opening pan 22 having a draining port 20 for draining the grinding fluid 58. The pan 22 is provided with upright plates 24 for preventing the grinding fluid 58 from splashing outside.

The pan 22 has an upper surface provided with an overhang X-feeding cutting apparatus 25 of a so-called cantilever type. The cutting apparatus 25 includes a column 26 disposed on the pan 22. The column 26 has a side surface provided with a supporting portion (not illustrated). The supporting portion rotatably supports a rotating shaft 28.

The rotating shaft 28 is mounted with a cutting blade block 30. The rotating shaft 28 has an end supported by a support arm 32, and another end mounted with a pulley 34. The pulley 34 is provided with a belt 36. By driving the belt 36 using a rotating shaft driving motor (not illustrated), the rotating shaft 28 and the cutting blade block 30 are rotated in a direction indicated by an arrow A for example.

Figure 2A:
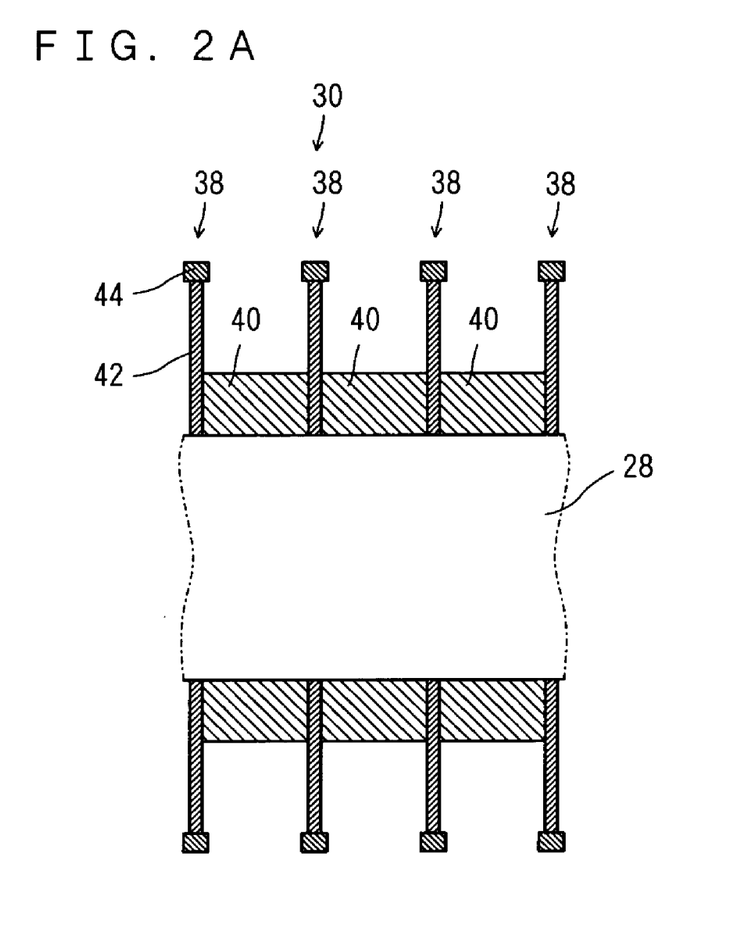
FIG. 2A is a conceptual diagram showing a section of a cutting blade block.

Referring to FIG. 2A, the cutting blade block 30 includes a plurality of cutting blades 38. Each of the cutting blades 38 is spaced from an adjacent one of the others by an annular spacer 40. Each of the cutting blades 38 includes a base plate 42 like a doughnut shaped disc. The base plate 42 has an outer circumferential edge provided with a cutting edge 44.

The base plate 42 is made for example of a hard alloy such as tungsten carbide or a high speed steel. Alternatively, the base plate 42 may be made of a sintered diamond alloy which is an alloy made by sintering diamond or cBN (cubic-system boron nitride) or the like with a hard alloy, disclosed in the Japanese Patent Laid-Open Nos. 8-109431 and 8-109432.

Figure 2B:
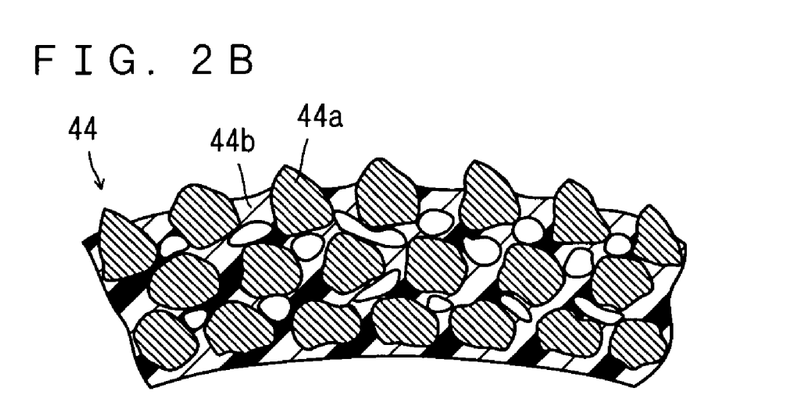
FIG. 2B is a conceptual diagram showing a partial section of a cutting edge.

Further, as shown in FIG. 2B, the cutting edge 44 is made of a mixture of an abrasive grain 44a and a heat resistant resin 44b. Specifically, the abrasive grain 44a is bonded by the heat resistant resin 44b to the base plate 42.

The abrasive grain 44a is made of a super hard abrasive grain for example. The super hard abrasive grain may be such substance as natural or synthetic diamond powder, cBN powder, and a mixture of the natural or synthetic diamond powder and cBN powder. The abrasive grain 44a has a grain diameter of about 160 µm–250 µm.

The heat resistant resin 44b is made of a thermosetting resin such as a phenol resin and a polyimide resin for example. Further, the heat resistant resin 44b may be added with metal powder having a particle diameter of a few micron meter.

Returning to FIG. 1, the pan 22 has an upper surface provided with a pair of rails 46, in which an X-slider 48 is slidably mounted. The X-slider 48 has an upper surface provided with a chuck table 50 having an upper surface disposed with a pasting plate 52. The pasting plate 52 has an upper surface to which the magnetic member 54 is fixed by adhesive at the time of grinding. The magnetic member 54 is a rare-earth alloy magnet member for a voice coil motor (VCM) for example. The rare-earth alloy magnet member as above has a very high grinding resistance due to its constitution by hard primary phase and a tough grain boundary phase. When grinding such a material by an edge made of resin and abrasive grain, wearing of the edge is a major problem.

The voice coil motor referred to herein is used for example in a disc drive as shown in FIG. 9 of the U.S. Pat. No. 5,448,437. In this FIG. 9, the voice coil motor is indicated by a reference number 37. The rare-earth alloy magnet member cut by the cutting blade 38 is then surface-treated to yield a rare-earth magnet. Such a rare-earth magnet is used as magnets indicated by reference numbers 3, 4, 5, and 6 in FIGS. 1 and 2 of the U.S. Pat. No. 5,448,437 for example. Further, a manufacturing method and other information about Nd—Fe—B rare-earth magnet is disclosed in the U.S. Pat. Nos. 4,770,723 and 4,792,368. The rare-earth magnet comprises an "R—T—(M)—B magnet", where R is a rare-earth element including Y, T is Fe or a Fe—Co compound, M is an additive and B is boron.

With the above arrangement, by sliding the X-slider 48 in a direction indicated by an arrow B (along an X axis), thereby relatively moving the magnetic member 54 at a constant speed toward the cutting blade block 30 rotating in the direction indicated by the arrow A, the magnetic member 54 can be cut into a predetermined dimension. When cutting the magnetic member 54, sludge 90 is produced. When cutting the magnetic member 54, as shown also in FIG. 3, the grinding fluid 58 is supplied to a grinding region 60 from a grinding fluid discharging device 56 disposed near the cutting blades 38.

Figure 3:
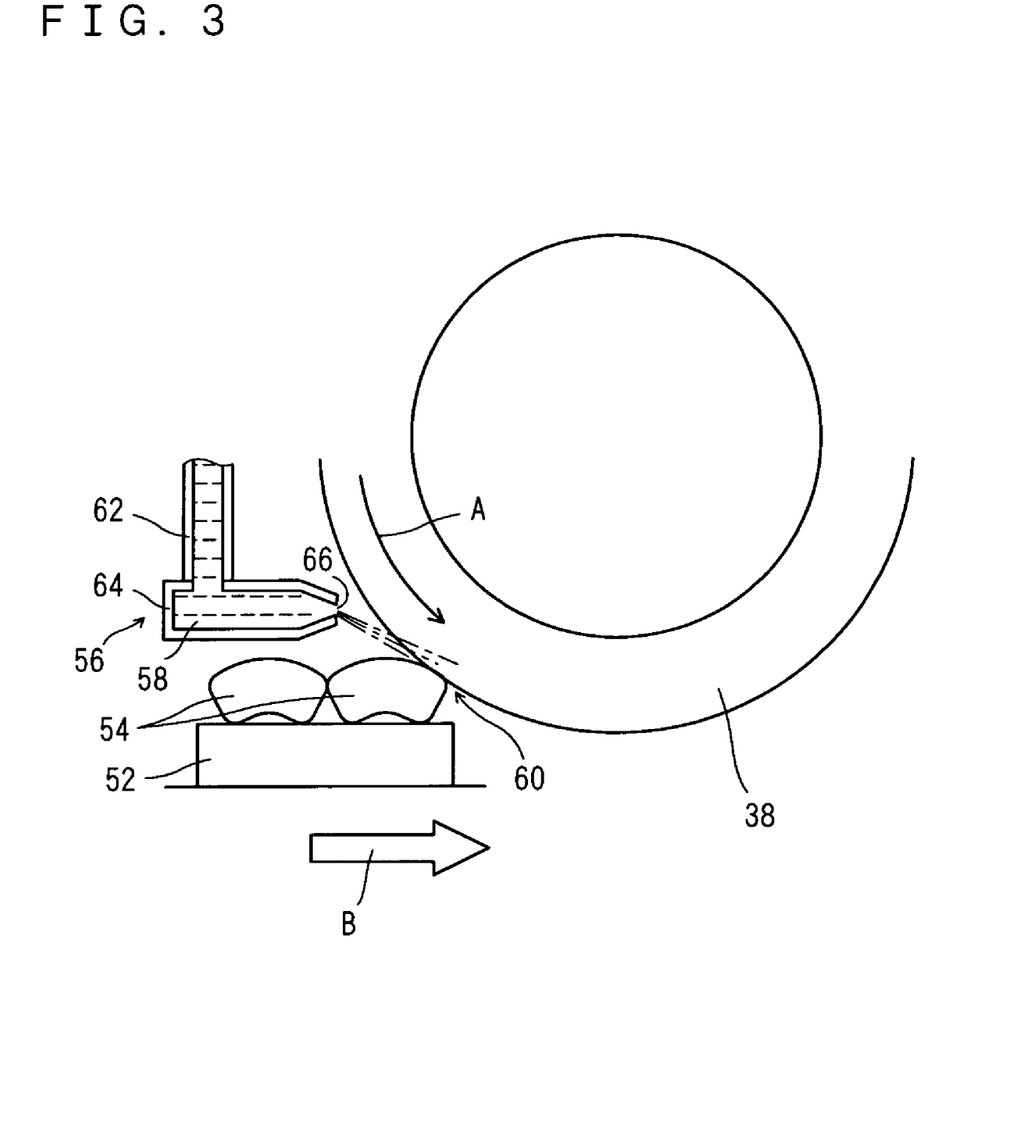
FIG. 3 is a diagram showing a grinding fluid discharging device disposed near the cutting blades.

The grinding fluid 58 is primarily made of water. If the grinding fluid is primarily made of oil for example, the sludge 90 can not move easily in the grinding fluid 58 because of a high viscosity of the oil. However, since water has a low viscosity, the sludge 90 can easily move. Therefore, if water is the primary ingredient of the grinding fluid 58, it becomes possible to draw the sludge 90 at a lower magnetic flux density. Further, since water has a high specific heat, the cutting edge 44 can be cooled efficiently.

The grinding fluid discharging device 56 includes a stagnation portion 64 connected to a grinding fluid supplying path 62. The stagnation portion 64 is supplied with the grinding fluid 58 coming from the grinding fluid supplying path 62. The grinding fluid 58 is discharged to the grinding region 60 from a discharging port 66 formed at a tip of the stagnation portion 64, at a pressure of 2 kgf/cm$^2$–10 kgf/cm$^2$. It should be noted here that the discharging port 66 is variably angled according to the size of the cutting blades 38.

Returning to FIG. 1, the grinding fluid 58 used at the grinding operation portion 12 gets out of the draining port 20 of the pan 22, and is stored in a reservoir 70 of the purifying portion 14 via the grinding fluid draining path 68. A barrier member 72 is provided inside the reservoir 70 for facilitating sedimentation of the sludge 90 contained in the grinding fluid 58. Further, a magnet separator 74 is disposed near the barrier member 72. The magnet separator 74 includes a magnet roller 76 for drawing the sludge 90 thereto and a squeezing roller 78 for removing the grinding fluid 58 on the magnet roller 76. The barrier member 72 is formed as an increasingly steep upslope for easier contact of the grinding fluid 58 with the magnet roller 76.

Figure 4A:
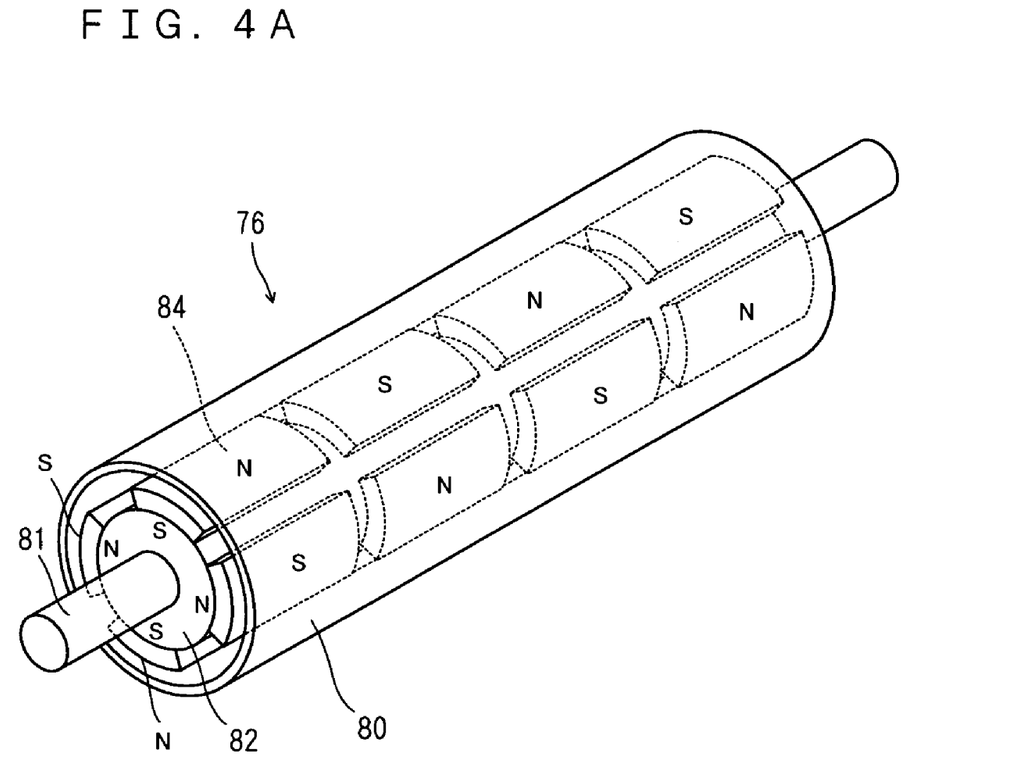
FIG. 4A is a perspective view showing a magnet roller.
Figure 4B:
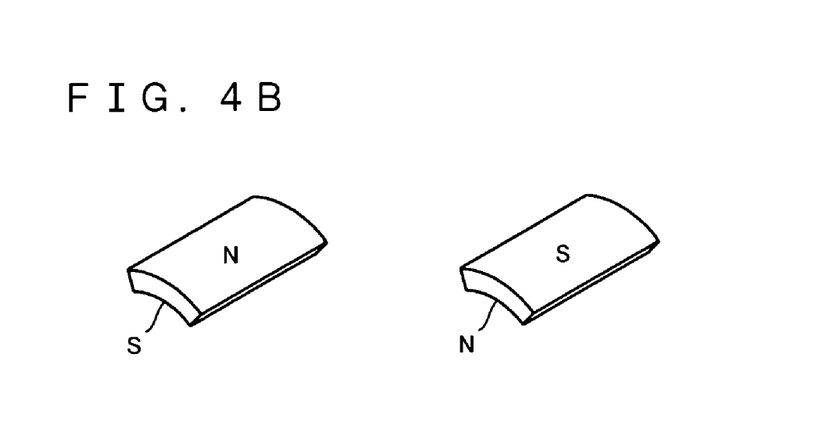
FIG. 4B is a perspective view showing a magnet.

The magnet roller 76 includes a hollow cylinder 80 as shown in FIG. 4A. A cylinder 82 penetrated by a main shaft 81 is disposed in the hollow cylinder 80. The cylinder 82 has an outer circumferential surface disposed with magnets 84. The magnets 84 are disposed for example in four longitudinal lines and four circumferential rows generally at a same interval so that a total of sixteen magnets 84 are used. As shown in FIG. 4B, the magnets 84 includes two kinds of magnets each magnetized in a direction of a thickness. Polarity of the magnets 84 is alternated in each of the longitudinal lines of the magnets 84, and in each of the circumferential rows of the magnets 84. Each of the magnets 84 is a neodymium magnet for example as disclosed in the U.S. Pat. No. 4,770,723. The sludge 90 is drawn by the magnets 84 onto the outer circumferential surface of the hollow cylinder 80.

It should be noted here that if the hollow cylinder 80 has a circumferential surface magnetic flux density not smaller than 0.25 T (T is tesla), then the sludge can be easily separated from the grinding fluid 58 even if the sludge contains rare-earth alloy which is difficult to draw by the magnets 84. The magnet roller 76 is rotated by an unillustrated electric motor in a direction indicated by an arrow C for example (see FIG. 5). The surface magnetic flux density of the hollow cylinder 80 is measured for example with a gauss meter and a probe (both manufactured by Bell Corporation and sold by Toyo Tsusho Co., Ltd.) by contacting the probe to an object of the measurement.

Figure 5:
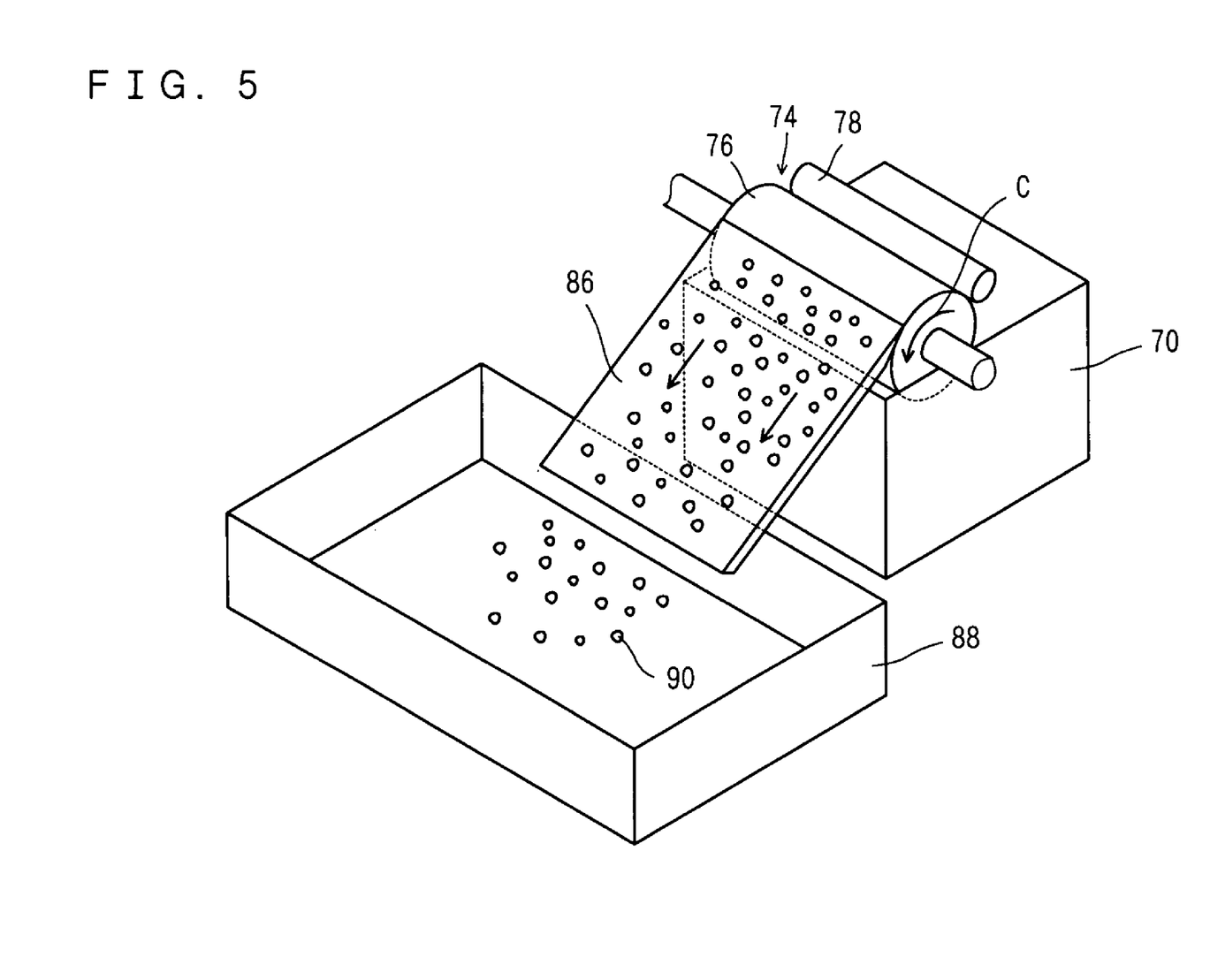
FIG. 5 is a conceptual diagram illustrating a function of a scraper.

Referring to FIG. 1 and FIG. 5, the grinding fluid 58 containing the sludge 90 is fed to the magnet separator 74 when flowing over an upper edge of the barrier member 72. The sludge 90 is drawn to the magnet roller 76. Then, the grinding fluid 58 is squeezed off on the magnet roller 76 by the squeezing roller 78. Thereafter, the sludge 90 drawn onto the magnet roller 76 is removed by a scraper 86 held against the outer circumferential surface of the magnet roller 76 and damped into a sludge box 88. As described above, the sludge 90 is magnetically separated from the used grinding fluid 58 by the magnet separator 74. The magnet separator 74 is effective, especially for separating fine-particle sludge.

After passing the magnet roller 76, the grinding fluid 58 flows out of a draining port (not illustrated) provided below the magnet roller 76 and then into a tank 92 (i.e. a right hand portion of the tank 92 separated by a partition board 94) disposed on a downstream side of the magnet separator 74 and the reservoir 70. The sludge 90, made of fine particles of the rare-earth alloy, has coercive force as a magnet though small. Thus, even if not having been drawn to the magnet roller 76, the sludge 90 is magnetized by the magnet roller 76, and therefore coagulates and sediments quickly in the tank 92. Further, barrier plates 94, 96 and 98 are disposed inside the tank 92 in order to prevent the sludge 90 from moving, and to make the path longer, which facilitates the sedimentation of the sludge 90. The grinding fluid 58 flows along a path indicated by an arrow D. Therefore, while moving in the tank 92, the sludge 90 sediments in the tank 92, and the separation of the sludge 90 from the grinding fluid 58 is further promoted. Further, even small particles of the sludge can be separated quickly from the grinding fluid 58 through the sedimentation promoted by the coagulation. As a result, a large tank becomes no longer necessary for separating the sludge 90 from the grinding fluid 58, making possible to decrease the size of the apparatus.

The grinding fluid 58 in the tank 92 thus separated from the sludge 90 and therefore purified is then pumped by a pump 100 as part of the circulating portion 16, and supplied to the grinding fluid discharging device 56 via the grinding fluid supplying path 62 for use in circulation.

Now, operation of the grinding apparatus 10 as described above will be outlined.

First, in the grinding operation portion 12, the magnetic member 54 is cut by the cutting blades 38 while the grinding fluid 58 is supplied to the grinding region 60. Then, the grinding fluid 58 containing the sludge 90 is introduced into the reservoir 70 via the grinding fluid draining path 68. The grinding fluid 58 is then supplied to the surface of the magnet separator 74, to allow the magnet separator 74 to draw impurities such as the sludge 90 to the surface of the magnet separator 74. The grinding fluid 58 which has passed the magnet separator 74 is introduced into the tank 92, and impurities such as sludge 90 remaining in the grinding fluid 58 is sedimented in the tank 92. Only supernatant fluid in the tank 92 thus obtained is pumped and re-circulated by the pump 100. The impurities such as the sludge 90 sedimented in the tank 92 is removed timely by a discretionary method.

By using the grinding fluid 58 from which the sludge 90 has been removed as described above, in the cutting of the magnetic member 54, life of the cutting edge 44 can be increased.

Now, experiments conducted to the grinding apparatus 10 will be described.

Conditions of the experiments is summarized in Table 1.

TABLE 1

| Experiment Conditions | |
|---|---|
| Cutting apparatus | X-feed cutting apparatus (Feeding direction indicated by arrow B in FIG. 1) |

TABLE 1-continued

Experiment Conditions

| | | |
|---|---|---|
| Cutting speed | 10 mm/min | |
| Cutting blade circumferential speed | 2070 m/min | |
| Cutting blade | Phenol resin + diamond abrasive grain (20 volume %) Abrasive grain diameter: 200 μm–250 μm Additive: Cu (a few μm) Dimensions: | |
| | Cutting blade outer diameter; | 125 mm |
| | Cutting edge thickness; | 1.0 mm |
| | Base plate thickness; | 0.9 mm |
| | Base blade inner diameter; | 40 mm |
| | (Nine blades assembled in a block) | |
| | Height of cutting edge; | 3 mm~4 mm |
| Grinding fluid | Type of coolant: | Chemical solution type 2% dilution |
| | Discharge pressure: | 3 kgf/cm²–4 kgf/cm² |
| Tank capacity | 600 L | |
| Flow into Tank | 60 L/min | |
| Work | Material: | Rare-earth alloy magnet member (Neodymium magnet member for voice coil motor) |
| | Dimensions: | 60 mm × 40 mm × 20 mm Two works were cut per pass. |
| Number of cutting cycles | 300 passes (600 works) | |

As shown in Table 1, the experiments used the cutting edge 44 including a phenol resin and a diamond abrasive grain (20 volume %). Each of the cutting blades 38 had an outer diameter of 125 mm, with the cutting edge 44 of a thickness of 1.0 mm. Each of the base plates 42 had a thickness of 0.9 mm, and an inner diameter of 40 mm. An edge volume (a height of the cutting edge 44) was 3 mm~4 mm.

The cutting blades 38 had a rotating speed (circumferential speed) of 2070 m/min, and the cutting speed was 10 mm/min. The grinding fluid 58 was prepared for example, by diluting JP-0497N manufactured by Castrol Limited, to 2% (weight %) by water. The works were Neomax 44H, a rare-earth alloy magnet member manufactured by Sumitomo Special Metals Co., Ltd.

A result shown in FIG. 6A–FIG. 8B are obtained from the experiment.

The term "surface magnetic flux density" used herein is a magnetic flux density on the outer circumferential surface of the hollow cylinder 80 of the magnet separator 74. The term "sludge removal rate" is a value indicating the extent of removal of the sludge 90 from the grinding fluid 58 achieved by passing the used grinding fluid 58 right after the cutting operation through the magnet separator 74. The term "removal by machining" is specifically a volume of the magnetic member 54 (per cutting blade 38) turned into the sludge 90 in the 300 passes of cutting the magnetic members 54. The term "cutting blade wear" is specifically a volume of wear (per cutting blade 38) in the cutting edge 44 of the cutting blade 38 in the 300 passes of cutting the magnetic members 54. The term "volume of sediment" is a volume of the sludge 90 contained in a unit of measurement (500 cc of the grinding fluid 58, according to the present experiments) of the grinding fluid 58. The term "sludge containing rate" is a weight percentage of the sludge 90 contained in 500 cc of the grinding fluid 58.

Under the conditions shown in Table 1, each of the following experiments was conducted.

Figure 6A:
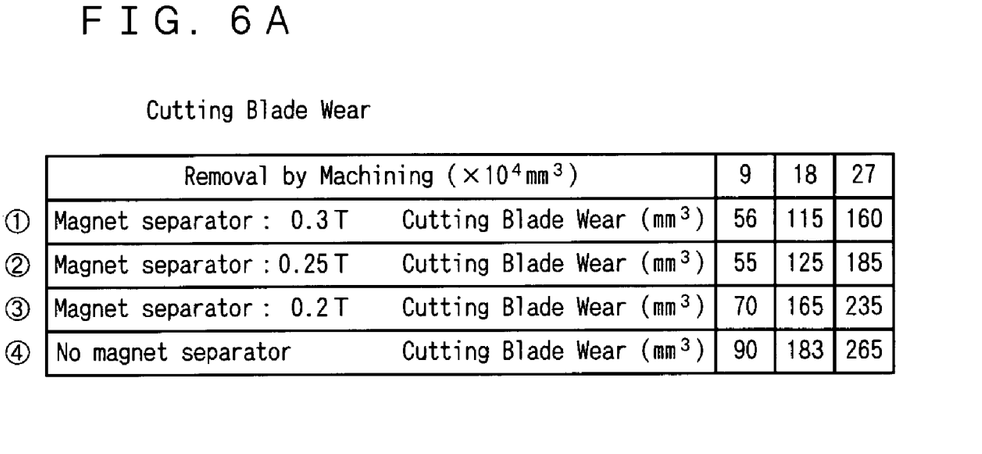
FIG. 6A is a table showing a result of Experiment 1.
Figure 6B:
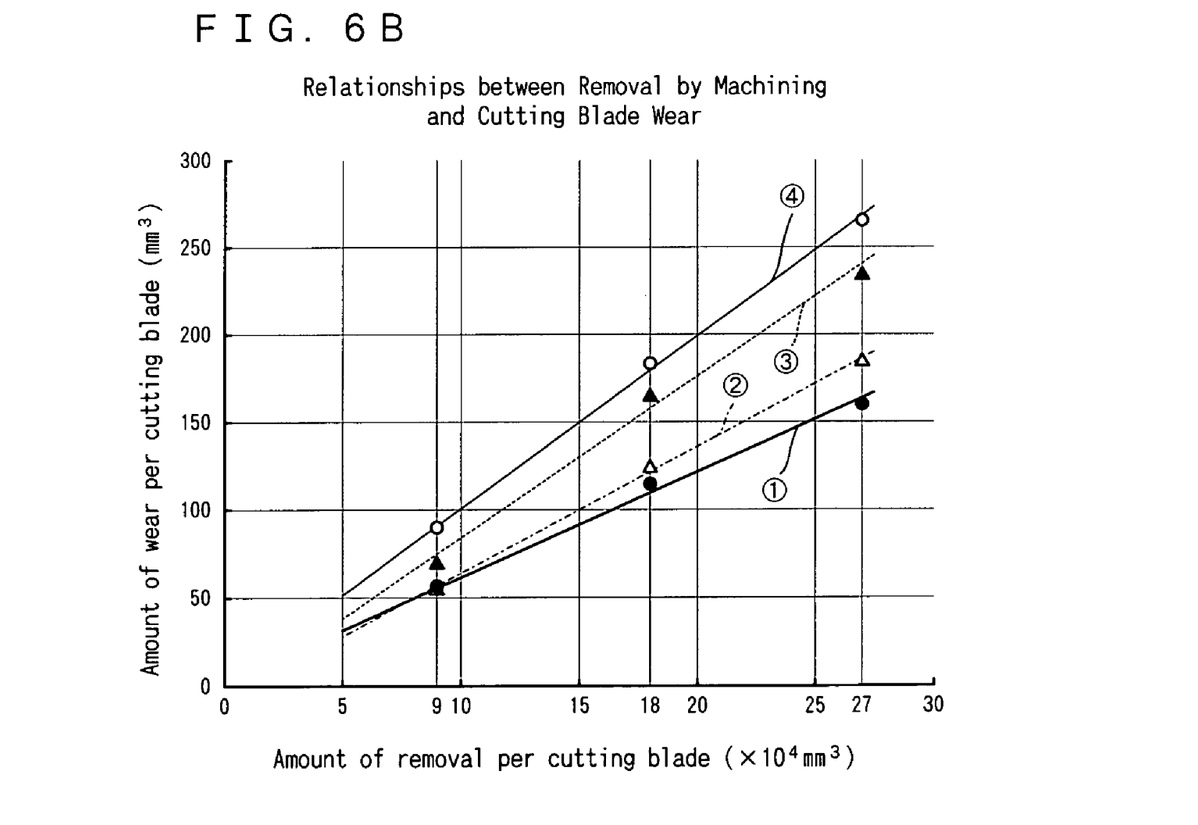
FIG. 6B is a graphical representation thereof.

First, in Experiment 1, the following four arrangements were compared in terms of the removal by machining and the cutting blade wear (FIG. 6A and FIG. 6B).

(1) One magnet separator (surface magnetic flux density of 0.3 T)+one tank (2) One magnet separator (surface magnetic flux density of 0.25 T)+one tank (3) One magnet separator (surface magnetic flux density of 0.2 T)+one tank (4) No magnet separator+one tank As shown in FIG. 6A and FIG. 6B, the cutting blade wear tends to decrease when magnetic flux density of the magnet separator 74 increases. Further, difference in the cutting blade wear between the cases (1)–(4) increases when the removal by machining increases, i.e. when the number of cuttings increases.

Among the cases where the magnet separator 74 was used, especially, if the magnetic flux density was not smaller than 0.25 T, the sludge 90 is removed efficiently, increasing the life of the cutting blade 38.

Figure 7A:
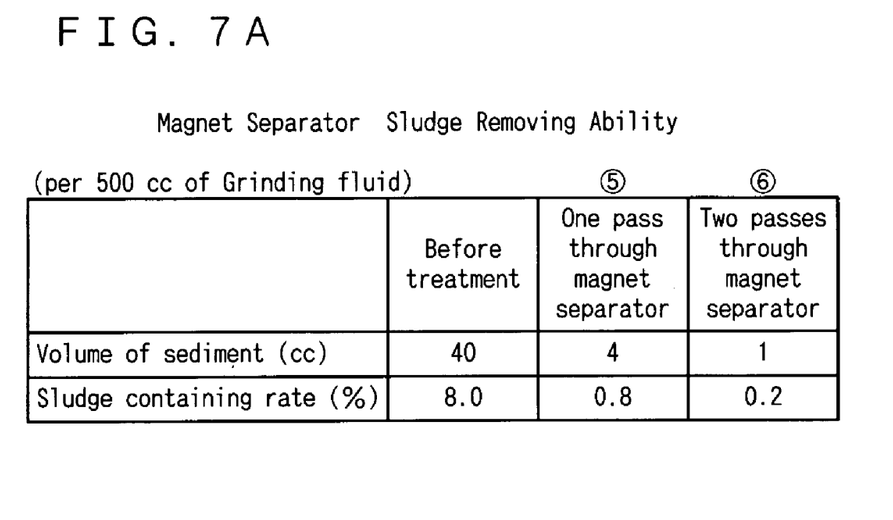
FIG. 7A is a table showing a result of Experiment 2.
Figure 7B:
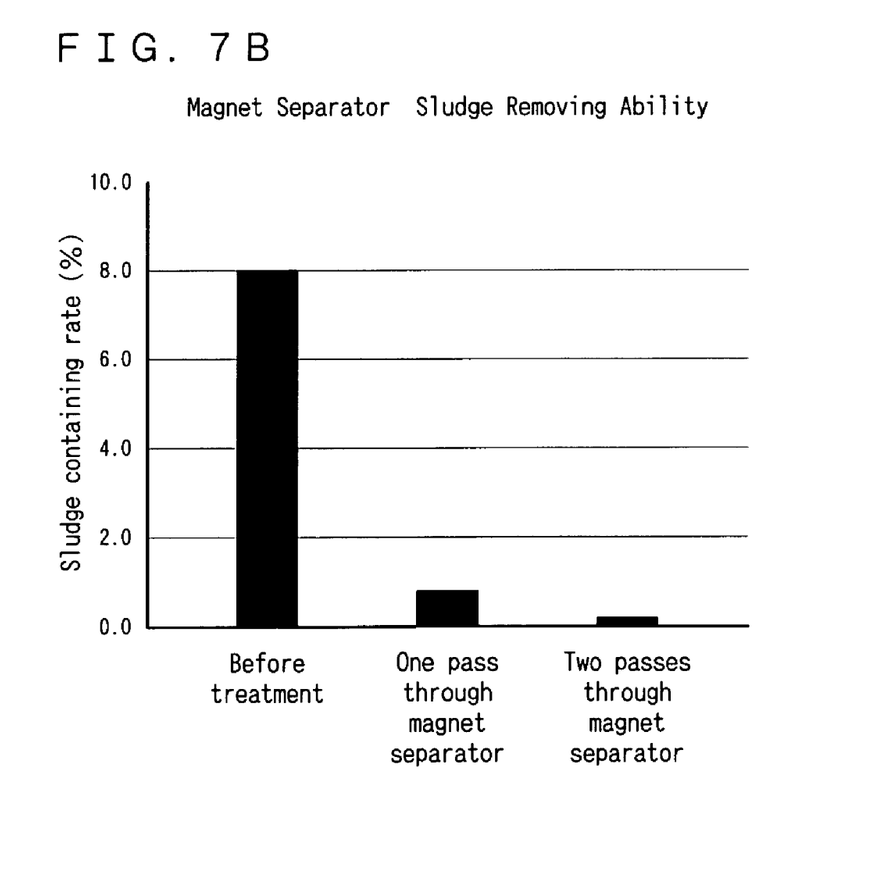
FIG. 7B is a graphical representation thereof.

Next, in Experiment 2 the number of the magnet separators 74 was varied and comparison was made between cases (5) and (6) (FIG. 7A and FIG. 7B). In this experiment, the surface magnetic flux density in each of the magnet separators 74 was 0.3 T.

(5) One magnet separator+one tank (6) Two magnet separators+one tank

As shown in FIG. 7A and FIG. 7B, it was learned that more sludge 90 can be removed if the number of the magnet separators 74 was increased.

Figure 8A:
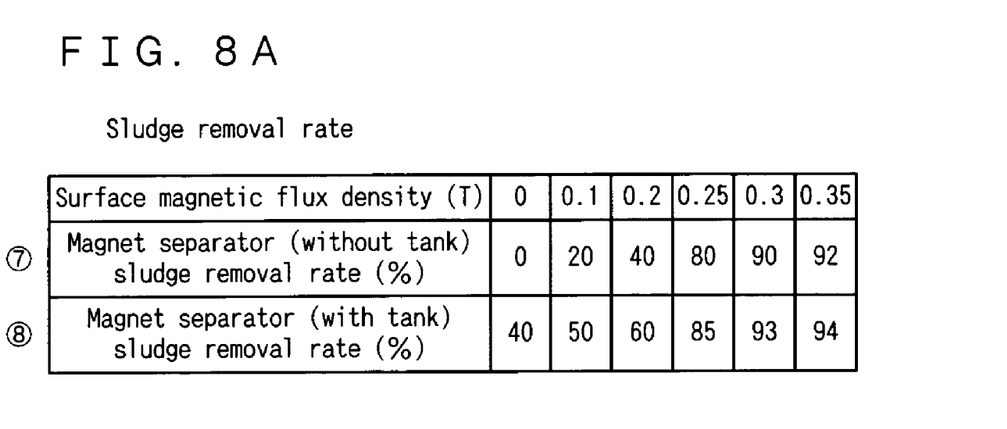
FIG. 8A is a table showing a result of Experiment 3.
Figure 8B:
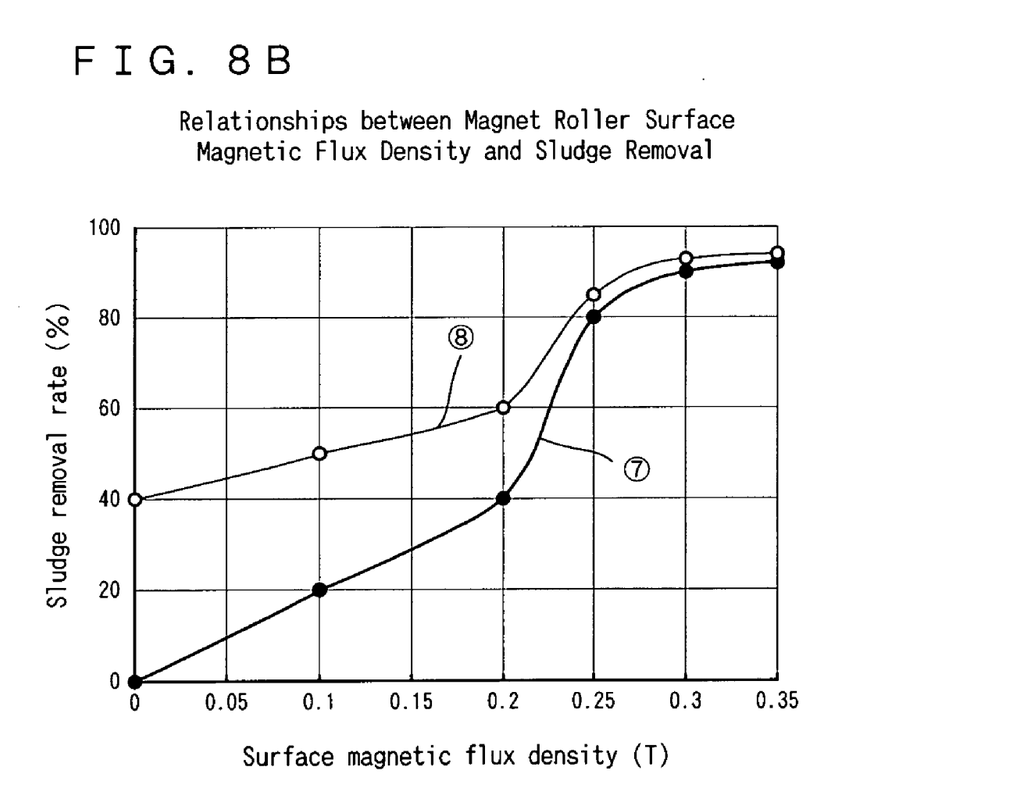
FIG. 8B is a graphical representation thereof.

Further, in Experiment 3, the surface magnetic flux density of the magnet separator 74 was varied, and comparison was made between cases (7) and (8) in terms of the separating effect of the sludge 90 (FIG. 8A and FIG. 8B).

(7) One magnet separator without tank (8) One magnet separator+tank

In each of the cases, the sludge removal rate at the grinding fluid discharging device 56 was measured.

As shown in FIG. 8A and FIG. 8B, it was learned that the sludge removal rate increases dramatically if the magnet flux density is not smaller than 0.25 T.

Further, the sludge removal rate was higher in the case (8) than in the case (7). This indicates that further separation of the sludge 90 can be made by allowing the sludge 90 to sediment in the tank 92 after the removal of the sludge 90 by the magnet separator 74.

As will be understood from the above results of the experiments, according to the grinding apparatus 10, the sludge 90 in the grinding fluid 58 can be sufficiently removed, making possible to use the grinding fluid 58 in circulation.

Specifically, in general, the grinding apparatus which uses a cutting blade having a cutting edge made of thermosetting resin and super hard abrasive grain (diamond abrasive grain) has problems if grinding fluid supplied to the grinding region contains sludge. For example, the sludge accumulates in the grinding region or between the cutting edge and the magnetic member to be cut, clogging a surface of the cutting blade, or discharge of chips during the grinding becomes insufficient. Further, at this time, increase in cutting resistance causes abnormal wear of the resin portion and falling of the super hard abrasive grain of the cutting blade, decreasing cutting efficiency. The cutting load is especially high if the magnetic member is a R—Fe—B magnet member which comprises a hard primary phase and a tough grain boundary phase, resulting in extremely low cutting efficiency. If this situation continues, the sludge comes in the circulation pump of the grinding fluid, causing abnormal wear, increasing the temperature of the grinding fluid.

However, according to the grinding apparatus 10, since the sludge 90 can be removed sufficiently from the grinding fluid 58, the problems as described above can be reduced even if the grinding fluid 58 is used in circulation, making possible to increase the life of the cutting blades 38.

Further, since the amount of the sludge 90 coming into the pump 100 which circulates the grinding fluid 58 is decreased, clogging of the pump 100 is prevented, and the abnormal wear of the pump 100 can be reduced.

Further, since the grinding fluid 58 can be used in circulation, the grinding fluid 58 can be used efficiently.

Still further, according to the grinding apparatus 10, the sludge 90 can be removed by the magnet separator 74 and then easily sedimented by coagulation. Thus, differing from the related art, there is no need to use a large tank, and the apparatus can be compact. For example, the apparatus according to the related art needs a large-capacity tank of about 3000 liters, but the tank 92 used in the grinding apparatus 10 can be of about 600 liters.

Further, if the surface magnetic flux density of the magnet separator 74 is made not smaller than 0.25 T, separating ability of the sludge 90 is increased, reducing wear of the heat resistant resin 44*b* caused by the sludge 90 at the time of grinding. The effect is particularly significant if the cutting edge 44 of the cutting blade 38 is made of thermosetting/heat-resistant resin and diamond abrasive grain.

The sludge containing rare-earth alloy coagulates easily, and therefore clogs and rusts easily. Thus, if the purifying apparatus uses a filter, the filter has to be replaced often at a cost of reduced efficiency. On the contrary, according to the grinding apparatus 10, non-use of the filter has eliminated the need for filter replacement, making possible to drastically reduce the operating cost.

It should be noted here that according to the above embodiment, description is made for a case in which the magnet separator 74 as the magnetic separating means uses permanent magnets. The present invention is not limited by this however. For example, electronic magnet and so on may be used alternatively. Further, as the grinding means, not only the cutting blade 38 but also any discretionary grinding means may be used. An example of the discretionary grinding means is a wire. The wire comprises a hard steel wire (piano wire) having a diameter of about 0.1 mm~0.3 mm, super hard abrasive grain having a diameter of 30 μm–60 μm, and resin such as phenol resin of a thickness of 30 μm–60 μm bonding the super hard abrasive grain to the hard steel wire. The present invention is applicable to wire sawing which uses the above wire.

Further, the present invention is applicable not only to the separation of the sludge 90 from the grinding fluid 58 but also to separation of sludge containing rare-earth alloy from any waste fluid.

The present invention being thus far described and illustrated in detail, it is obvious that these description and drawings only represent an example of the present invention, and should not be interpreted as limiting the invention. The spirit and scope of the present invention is only limited by words used in the accompanied claims.

What is claimed is:

1. A method for grinding a magnetic member, comprising:
   a first step of grinding a magnetic member by grinding means having an edge including heat resistant resin and super abrasive grain while supplying grinding fluid to a grinding region;
   a second step of magnetically separating sludge from the grinding fluid drained from the grinding region by using magnetic separation means; and
   a third step of introducing the grinding fluid which has undergone the second step into a tank provided therein with a plurality of barrier plates of different sizes capable of turning a flow of the grinding fluid by generally a right angle in a horizontal plane and providing the grinding fluid with a flowing path which changes directions in a horizontal plane at least two times, and separating the sludge from the grinding fluid by magnetic coagulation and subsequent sedimentation of the sludge in the tank,
   wherein the magnetic separation means includes a magnet roller having a plurality of magnets disposed in longitudinal lines and circumferential rows,
   polarity of the magnets being alternated in each of the longitudinal lines of the magnets, and in each of the circumferential rows of the magnets.

2. The method according to claim 1, wherein
   the magnetic member includes a rare-earth alloy,
   the second step using magnetic separation means having a surface magnetic flux density not smaller than 0.25 T for separation of the sludge.

3. The method according to claim 1, wherein the grinding fluid is primarily made of water.

4. The method according to claim 1, wherein the grinding fluid after separation of the sludge is supplied to the grinding region for use in circulation.

5. A method for treating waste fluid, comprising:
   a first step of separating sludge containing a rare-earth alloy from waste fluid by using magnetic separation means having a surface magnetic flux density not smaller than 0.25 T; and
   a second step of introducing the waste fluid which has undergone the first step into a tank provided therein with a plurality of barrier plates of different sizes capable of turning a flow of the waste fluid by generally a right angle in a horizontal plane and providing the waste fluid with a flowing path which changes directions in a horizontal plane at least two times, and separating the sludge from the waste fluid by magnetic coagulation and subsequent sedimentation of the sludge in the tank,
   wherein the magnetic separation means includes a magnet roller having a plurality of magnets disposed in longitudinal lines and circumferential rows,
   polarity of the magnets being alternated in each of the longitudinal lines of the magnets, and in each of the circumferential rows of the magnets.

6. An apparatus for grinding a magnetic member, comprising:
   grinding operation means for grinding a magnetic member by using grinding means having an edge including heat resistant resin and super abrasive grain while supplying grinding fluid to a grinding region;
   magnetic separation means for separating sludge from the grinding fluid drained from the grinding region; and a tank disposed on a downstream side of the magnetic separation means, for reception of the grinding fluid and sedimentation of magnetically coagulated sludge; and a plurality of barrier plates of different sizes in the tank, capable of turning a flow of the grinding fluid by generally a right angle in a horizontal plane and providing the grinding fluid with a flowing path which changes directions in a horizontal plane at least two times, wherein the magnetic separation means includes a magnet roller having a plurality of magnets disposed in longitudinal lines and circumferential rows, polarity of the magnets being alternated in each of the longitudinal lines of the magnets, and in each of the circumferential rows of the magnets.

7. The apparatus according to claim 6, wherein the magnetic member includes a rare-earth alloy, the magnetic separation means having a surface magnetic flux density not smaller than 0.25 T.

8. The apparatus according to claim 6, wherein the grinding fluid is primarily made of water.

9. The apparatus according to claim 6, further comprising circulating means for supplying the grinding fluid after separation of the sludge to the grinding region for use in circulation.

10. A rare-earth magnet obtained by using a grinding method: the method comprising;

a first step of grinding a magnetic member by grinding means having an edge including heat resistant resin and super abrasive grain while supplying grinding fluid to a grinding region, a second step of magnetically separating sludge from the grinding fluid drained from the grinding region by using magnetic separation means, and a third step of introducing the grinding fluid which has undergone the second step into a tank provided therein with a plurality of barrier plates of different sizes capable of turning a flow of the grinding fluid by generally a right angle in a horizontal plane and providing the grinding fluid with a flowing path which changes directions in a horizontal plane at least two times, and separating the sludge from the grinding fluid by magnetic coagulation and subsequent sedimentation of the sludge in the tank to obtain supernatant fluid of the grinding fluid, wherein the supernatant fluid is supplied to the grinding region for use in circulation, wherein the magnetic separation means includes a magnet roller having a plurality of magnets disposed in longitudinal lines and circumferential rows, polarity of the magnets being alternated in each of the longitudinal lines of the magnets, and in each of the circumferential rows of the magnets.

11. A method for grinding a magnetic member, comprising:

a first step of grinding a Nd—Fe—B rare-earth alloy by grinding means having an edge including heat resistant resin and super abrasive grain while supplying grinding fluid to a grinding region;

a second step of magnetically separating fine-particle sludge from the grinding fluid drained from the grinding region by using magnetic separation means; and a third step of introducing the grinding fluid which has undergone the second step into a tank provided therein with a plurality of barrier plates of different sizes capable of turning a flow of the grinding fluid by generally a right angle in a horizontal plane and providing the grinding fluid with a flowing path which changes directions in a horizontal plane at least two times, and separating the sludge from the grinding fluid by magnetic coagulation and subsequent sedimentation of the sludge in the tank, wherein the magnetic separation means includes a magnet roller having a plurality of magnets disposed in longitudinal lines and circumferential rows, polarity of the magnets being alternated in each of the longitudinal lines of the magnets, and in each of the circumferential rows of the magnets.

12. A method for grinding a magnetic member, comprising:

a first step of grinding a rare-earth alloy which includes a hard primary phase and a tough grain boundary phase by grinding means having an edge including heat resistant resin and super abrasive grain while supplying grinding fluid to a grinding region;

a second step of magnetically separating sludge from the grinding fluid drained from the grinding region by using magnetic separation means; and a third step of introducing the grinding fluid which has undergone the second step into a tank provided therein with a plurality of barrier plates of different sizes capable of turning a flow of the grinding fluid by generally a right angle in a horizontal plane and providing the grinding fluid with a flowing path which changes directions in a horizontal plane at least two times, and separating the sludge from the grinding fluid by magnetic coagulation and subsequent sedimentation of the sludge in the tank, wherein the magnetic separation means includes a magnet roller having a plurality of magnets disposed in longitudinal lines and circumferential rows, polarity of the magnets being alternated in each of the longitudinal lines of the magnets, and in each of the circumferential rows of the magnets.

* * * * *